(12) United States Patent
Kwon et al.

(10) Patent No.: US 9,568,779 B2
(45) Date of Patent: Feb. 14, 2017

(54) DISPLAY DEVICE WITH MICROCAVITIES

(71) Applicant: Samsung Display Co., Ltd., Yongin, Gyeonggi-Do (KR)

(72) Inventors: Seong Gyu Kwon, Suwon-si (KR); Seok-Joon Hong, Seongnam-si (KR); Dae Ho Song, Hwaseong-si (KR); Seon Uk Lee, Seongnam-si (KR); Woo Jae Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 177 days.

(21) Appl. No.: 14/494,896

(22) Filed: Sep. 24, 2014

(65) Prior Publication Data

US 2015/0268491 A1    Sep. 24, 2015

(30) Foreign Application Priority Data

Mar. 18, 2014    (KR) ........................ 10-2014-0031849

(51) Int. Cl.
    *G02F 1/1333*    (2006.01)
    *G02F 1/1341*    (2006.01)
    *G02F 1/1343*    (2006.01)

(52) U.S. Cl.
    CPC ....... *G02F 1/1341* (2013.01); *G02F 1/133377* (2013.01); *G02F 1/134336* (2013.01)

(58) Field of Classification Search
    CPC .............. G02F 1/133377; G02F 1/1341; G02F 1/134336
    See application file for complete search history.

(56) References Cited

U.S. PATENT DOCUMENTS

| | | | | |
|---|---|---|---|---|
| 5,995,190 A | * | 11/1999 | Nagae | G02F 1/133371 349/122 |
| 2013/0093985 A1 | * | 4/2013 | Kang | G02F 1/133377 349/106 |
| 2013/0321734 A1 | | 12/2013 | Won et al. | |

FOREIGN PATENT DOCUMENTS

KR    1020140071550    6/2014

* cited by examiner

*Primary Examiner* — James Dudek
(74) *Attorney, Agent, or Firm* — Innovation Counsel LLP

(57) ABSTRACT

The disclosure relates to a display device, and more particularly to a display device having an improved aperture ratio and robustness. The display device may provide a display device including: a substrate; a thin film transistor formed on the substrate; a pixel electrode connected to the thin film transistor; microcavities formed on the pixel electrode, the microcavities holding liquid crystals; a roof layer formed on the microcavities and covering some sides of the microcavities; and an encapsulation layer formed on the roof layer to seal the microcavities, wherein sides of neighboring microcavities define openings are disposed in a matrix configuration.

19 Claims, 19 Drawing Sheets

DISPLAY DEVICE WITH MICROCAVITIES

CROSS-REFERENCE TO RELATED APPLICATION

This application claims priority to and the benefit of Korean Patent Application No. 10-2014-0031849 filed in the Korean Intellectual Property Office on Mar. 18, 2014, the entire contents of which are incorporated herein by reference.

BACKGROUND (a) Technical Field

The present invention relates to a display device, and more particularly, to a display device having an improved aperture ratio and robustness.

(b) Description of the Related Art

A liquid crystal display is a type of flat panel display device that is widely used today. Typically, a liquid crystal display includes two display panels, wherein field generating electrodes such as a pixel electrode and a common electrode sandwich a liquid crystal layer interposed therebetween. The liquid crystal display generates an electric field in the liquid crystal layer by applying a voltage to the field generating electrodes to determine orientations of liquid crystal molecules of the liquid crystal layer and control polarization of incident light, thereby displaying an image.

The two display panels constituting the liquid crystal display may be referred to as a thin film transistor array panel and an opposing display panel. In the thin film transistor array panel, a gate line transferring a gate signal and a data line transferring a data signal are formed to cross each other, as well as a thin film transistor connected to the gate line and the data line, a pixel electrode connected to the thin film transistor, and the like. A light blocking member, a color filter, a common electrode, and the like may be formed in the opposing display panel. In some cases, the light blocking member, the color filter, and the common electrode may be formed in the thin film transistor array panel.

Conventionally, a liquid crystal display uses two substrates and constituent elements are formed on the two substrates. This structure has some disadvantages, such as the display device being heavy and thick, the cost being high, and the process time being long.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a display device which can decrease weight, thickness, cost, and process time by manufacturing the display device using one substrate.

Further, the embodiments in this disclosure provide a display device having an improved aperture ratio and a robust structure.

In addition, embodiments disclosed herein provide a display device including a layer of two or more liquid materials.

An exemplary embodiment of the inventive concept provides a display device including: a substrate; a thin film transistor formed on the substrate; a pixel electrode connected to the thin film transistor; microcavities formed on the pixel electrode, the microcavities holding liquid crystals; a roof layer formed on the microcavities and covering some sides of the microcavities; and an encapsulation layer formed on the roof layer to seal the microcavities, wherein sides of neighboring microcavities define openings that are disposed in a matrix configuration.

The openings may have a rhombic shape.

The injection holes may include: a first injection hole formed on a first side surface of one of the microcavities; and a second injection hole formed on a second side surface of the one of the microcavities, wherein the first injection hole and the second injection hole are formed to face each other.

The microcavities may have an octagonal shape.

The roof layer may cover sides of the microcavities other than the first side surface and the second side surface.

The substrate may be divided into a first region and a second region, and wherein at least one microcavity of the microcavities may have a first side surface and a second side surface which face each other and a third side surface and a fourth side surface which face each other, the first, second, third, and fourth side surfaces not being adjacent to each other, the first injection hole and the second injection hole are respectively formed through the first side surface and the second side surface of the microcavity at the first region, and the first injection hole and the second injection hole may respectively expose the third side surface and the fourth side surface of the microcavity at the second region.

A height of the roof layer located above the microcavities may be higher than that of the roof layer located between the microcavities.

The openings may have a polygonal shape.

The injection holes may include: a first injection hole extending through a part of the first side surface of the microcavity; and a second injection hole extending through an entire part of the second side surface of the microcavity.

An area of the first injection hole may be different from that of the second injection hole.

Another exemplary embodiment provides a display device including: a substrate; a thin film transistor formed on the substrate; a pixel electrode connected to the thin film transistor; microcavities formed on the pixel electrode, the microcavities holding a material layer; a roof layer formed on the microcavities and covering some sides of the microcavities; and an encapsulation layer formed on the roof layer to seal the microcavities, wherein the roof layer covers the sides of the microcavities that are not coupled to injection holes.

each of the microcavities may have a first side surface and a second side surface that face each other, the microcavities may include a first microcavity and a second microcavity, and the injection holes may include a first injection hole extending to the first side surface of the first microcavity, and a second injection hole extending to a second side surface of the second side surface.

A second side surface of the first microcavity and a first side surface of the second microcavity may be covered by the roof layer.

The first microcavity and the second microcavity may be adjacently disposed in a column direction and a row direction, and the first injection hole and the second injection hole may be formed to face each other with the opening therebetween.

The microcavities which are disposed in a row direction may be provided by repeatedly disposing one first microcavity and two microcavities according to a pattern.

The microcavities may further include a third microcavity having all sides covered by the roof layer.

The material layer may include a first liquid crystal layer made of a first liquid crystal material and a second liquid crystal layer made of a second liquid crystal material, the first liquid crystal layer and the second liquid crystal layer may fill different microcavities, and the first liquid crystal material and the second liquid crystal material may have different properties.

The first liquid crystal material may be different from the second liquid crystal material in response speed or transmittance.

The material layer may include a red organic light emitting material layer, a green organic light emitting material layer, and a blue organic light emitting material layer, and the red, green, and blue organic light emitting material layers may fill different microcavities.

The material layer may include a red quantum dot material layer and a green quantum dot material layer, and the red quantum dot material layer and the green quantum dot material layer may fill different microcavities.

In accordance with the exemplary embodiments, it is possible to provide the following effects.

The display device in accordance with the exemplary embodiments can improve an aperture ratio by reducing an area of the openings formed in the roof layer, and can strengthen the structure of the microcavities by reducing an area of the injection holes.

Further, the display device can form different liquid material layers in the adjacent microcavities by forming the injection hole in only one side surface of the microcavity and appropriately disposing the injection hole.

DETAILED DESCRIPTION OF THE EMBODIMENTS

Figure 1:
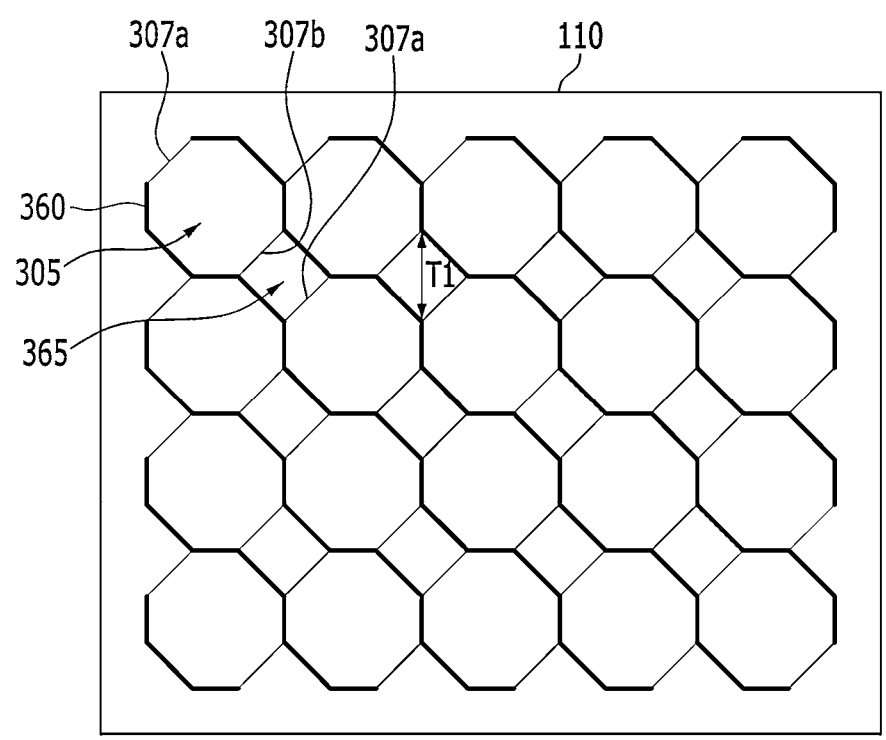
FIG. 1 is a top plan view illustrating a display device in accordance with an exemplary embodiment of the present inventive concept.

The inventive concept will be described more fully hereinafter with reference to the accompanying drawings, in which exemplary embodiments are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A display device in accordance with an exemplary embodiment will be briefly described with reference to FIG. 1.

FIG. 1 is a top plan view illustrating the display device in accordance with the exemplary embodiment of the present inventive concept.

The display device in accordance with the exemplary embodiment of the present inventive concept includes a substrate 110 formed of a material such as glass and plastic.

A plurality of microcavities 305 covered by roof layers 360 are formed on the substrate 110. The microcavities 305 may have a substantially octagonal planar shape. The microcavities 305 may be disposed in rows and columns. As a result, the microcavities 305 may be disposed in a matrix form. In the embodiment of FIG. 1, a total of 20 microcavities 305 are formed by disposing 5 microcavities 305 in the row direction and 4 microcavities 305 in the column direction. However, this particular arrangement is not a limitation of the inventive concept, and the shape, disposal form, and number of microcavities 305 may be changed.

A plurality of openings 365 are formed in the roof layer 360. No microcavity 305 is formed in regions where the openings 365 are located. The openings 365 may have a substantially rhombic planar shape. The openings 365 may be disposed in rows and columns, for example in a matrix form. In the embodiment of FIG. 1, a total of 12 openings 365 are formed by disposing 4 openings 365 in the row direction and 3 openings 365 in the column direction. However, this particular arrangement is not a limitation of the inventive concept, and the shape, disposal form, and number of the openings 365 may be changed.

The microcavities 305 are partially exposed at portions that interface the openings 365. The roof layer 360 is formed to cover the upper surfaces and a part of side surfaces of the microcavities 305. The roof layer 360 does not cover all of the side surfaces of the microcavities 305. The microcavities 305 are exposed through the side surfaces of the microcavities 305 that are not covered by the roof layer 360. As used herein, the parts of the microcavities 305 that are exposed are referred to as injection holes 307a and 307b.

The injection holes 307a and 307b are formed at opposite edges of each of the microcavities 305, such as the sides of neighboring octagonal microcavities 305 that form the facing sides of an opening 365. The injection holes 307a and 307b include a first injection hole 307a and a second injection hole 307b. The first injection hole 307a is formed to expose a first side surface of the microcavity 305, and the second injection hole 307b is formed to expose a second side surface of the microcavity 305. The first side surface and the second side surface of the microcavity 305 face each other. Accordingly, the first injection hole 307a and the second injection hole 307b are formed to face each other.

The roof layer 360 does not cover the first and second side surfaces of the microcavity 305 at which the injection holes 307a and 307b are respectively formed. The roof layer is formed to cover the six remaining side surfaces of the microcavity 305 except the first side surface and the second side surface.

An alignment material, a liquid crystal material, or the like may be injected into the microcavity 305 through the injection holes 307a and 307b. In this case, the opening 365 is required to be equal to or larger than a predetermined size to facilitate easy injection of the alignment material, the liquid crystal material, or the like. In one embodiment, the predetermined size may be that a length T1 of each diagonal of the openings 365 is about 50 μm.

Generally, in a display device, all openings positioned in the same row are connected to each other to have a quadrangular shape, thereby occupying a relatively large area. In the present exemplary embodiment, the openings that are adjacent in the row direction are separated from each other by microcavities 305 because the openings are disposed in a matrix configuration. Accordingly, the areas of the microcavities may be increased by reducing the areas occupied by the openings, thereby improving an aperture ratio.

Further, when a large amount of liquid crystal material is supplied to a specific opening, the opening may appear as a spot in the displayed image. In the present exemplary embodiment, a liquid crystal material that is supplied to one opening is injected into a microcavity located in a different row. Different color pixels are disposed at different rows, thereby reducing the formation of visual artifacts such as spots.

The aforementioned structure of the display device in accordance with the present exemplary embodiment is merely an example, and various modifications are feasible. For example, additional openings may be formed at parts of the roof layer 360 which covers the side surfaces of the microcavities 305, thereby allowing adjacent microcavities 305 to be connected to each other.

Hereinafter, one pixel of the display device in accordance with the exemplary embodiment of the present inventive concept will be briefly described with reference to FIG. 2.

Figure 2:
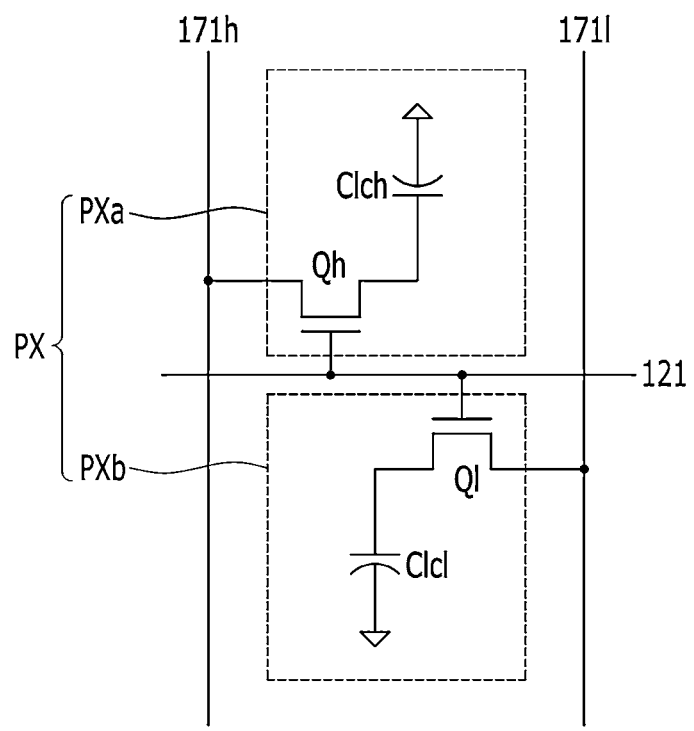
FIG. 2 is an equivalent circuit diagram of one pixel of the display device in accordance with the exemplary embodiment of the present inventive concept.

FIG. 2 is an equivalent circuit diagram of one pixel of the display device in accordance with the exemplary embodiment of the inventive concept.

The display device of the present exemplary embodiment includes a plurality of signal lines 121, 171h, and 171l, and a plurality of pixels PX connected to the plurality of signal lines 121, 171h, and 171l. Although not explicitly shown, a plurality of pixels PX may be arranged in a matrix including a plurality of pixel rows and a plurality of pixel columns.

Each pixel PX may include a first sub-pixel PXa and a second sub-pixel PXb. The first sub-pixel PXa and the second sub-pixel PXb may be disposed between adjacent signal lines 171h and 171l, as in the embodiment that is shown.

The signal lines 121, 171h, and 171l include a gate line 121 for transmitting a gate signal, and a first data line 171h and a second data line 171l for transmitting different data voltages.

The display device in accordance with the exemplary embodiment includes a first switching element Qh connected to the gate line 121 and the first data line 171h, and a second switching element Ql connected to the gate line 121 and the second data line 171l.

A first liquid crystal capacitor Clch connected with the first switching element Qh is formed in the first sub-pixel PXa, and a second liquid crystal capacitor Clcl connected with the second switching element Ql is formed in the second sub-pixel PXb.

A first terminal of the first switching element Qh is connected with the gate line 121, a second terminal thereof is connected with the first data line 171h, and a third terminal thereof is connected to the first liquid crystal capacitor Clch.

A first terminal of the second switching element Ql is connected with the gate line 121, a second terminal thereof is connected with the second data line 171l, and a third terminal thereof is connected to the second liquid crystal capacitor Clcl.

The operation of the liquid crystal display in accordance with the exemplary embodiment will now be described. When a gate-on voltage is applied to the gate line 121, the first switching element Qh and the second switching element Ql connected to the gate line 121 enter a turn-on state, and the first and second liquid crystal capacitors Clch and Clcl are charged by different data voltages transmitted through the first and second data lines 171h and 171l. The data voltage transmitted by the second data line 171l is lower than the data voltage transmitted by the first data line 171h. Accordingly, the second liquid crystal capacitor Clcl is charged with a lower voltage than that of the first liquid crystal capacitor Clch, thereby improving side visibility.

Hereinafter, a structure of one pixel of the liquid crystal display in accordance with the exemplary embodiment will be described with reference to FIGS. 3 to 6.

Figure 3:
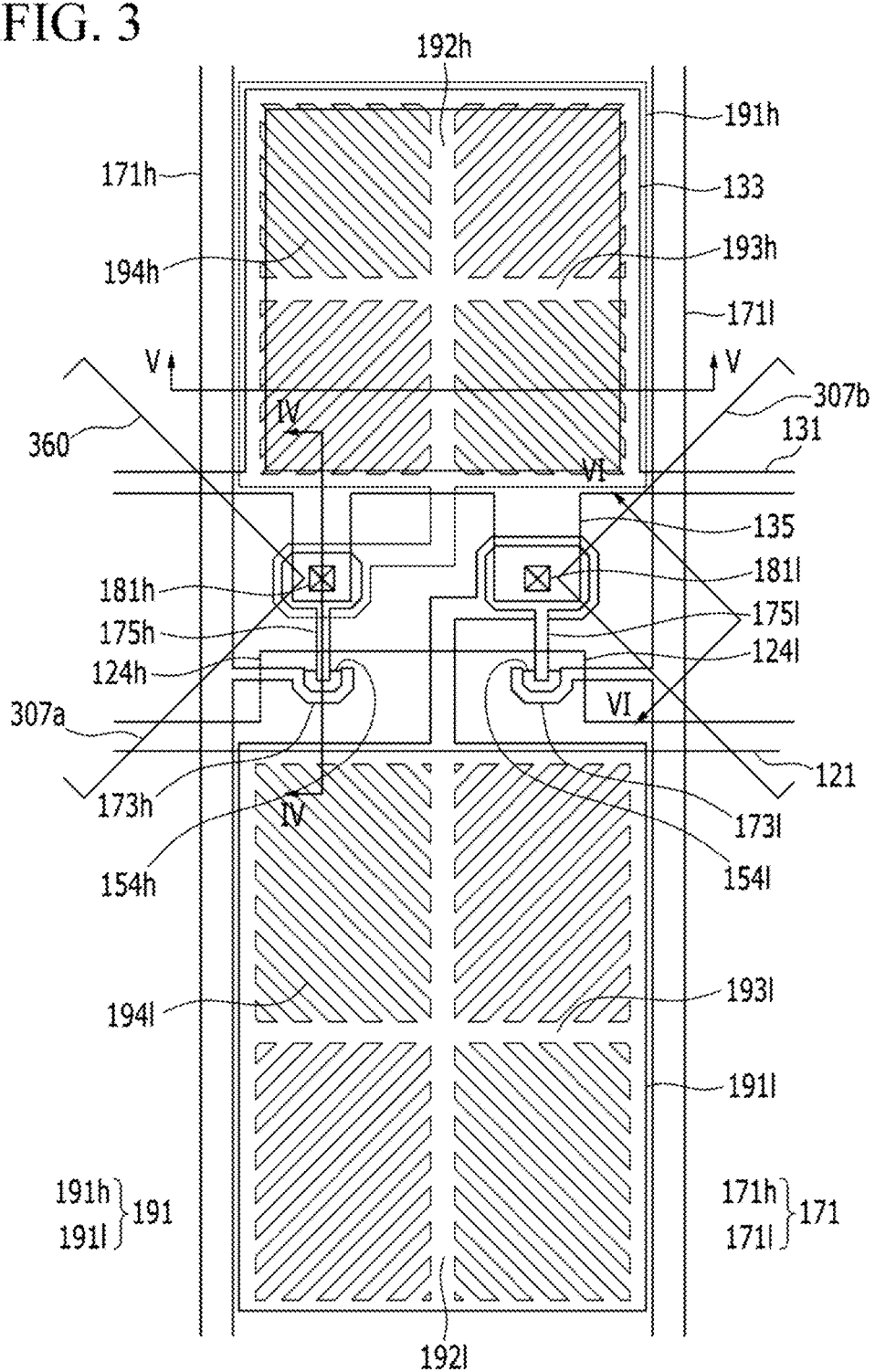
FIG. 3 is a layout view illustrating a part of the display device in accordance with the exemplary embodiment of the present inventive concept.
Figure 4:
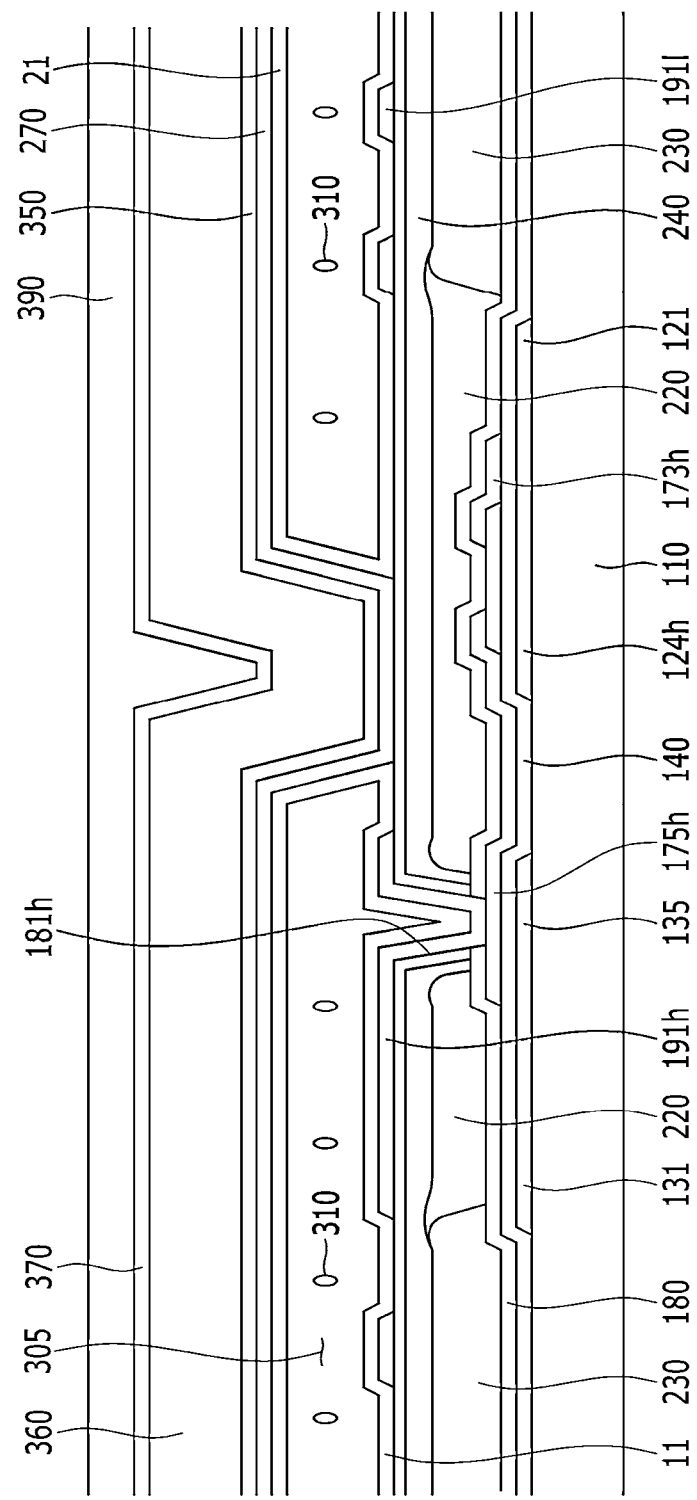
FIG. 4 is a cross-sectional view illustrating the display device in accordance with the exemplary embodiment of the present inventive concept taken along line IV-IV of FIG. 3.
Figure 5:
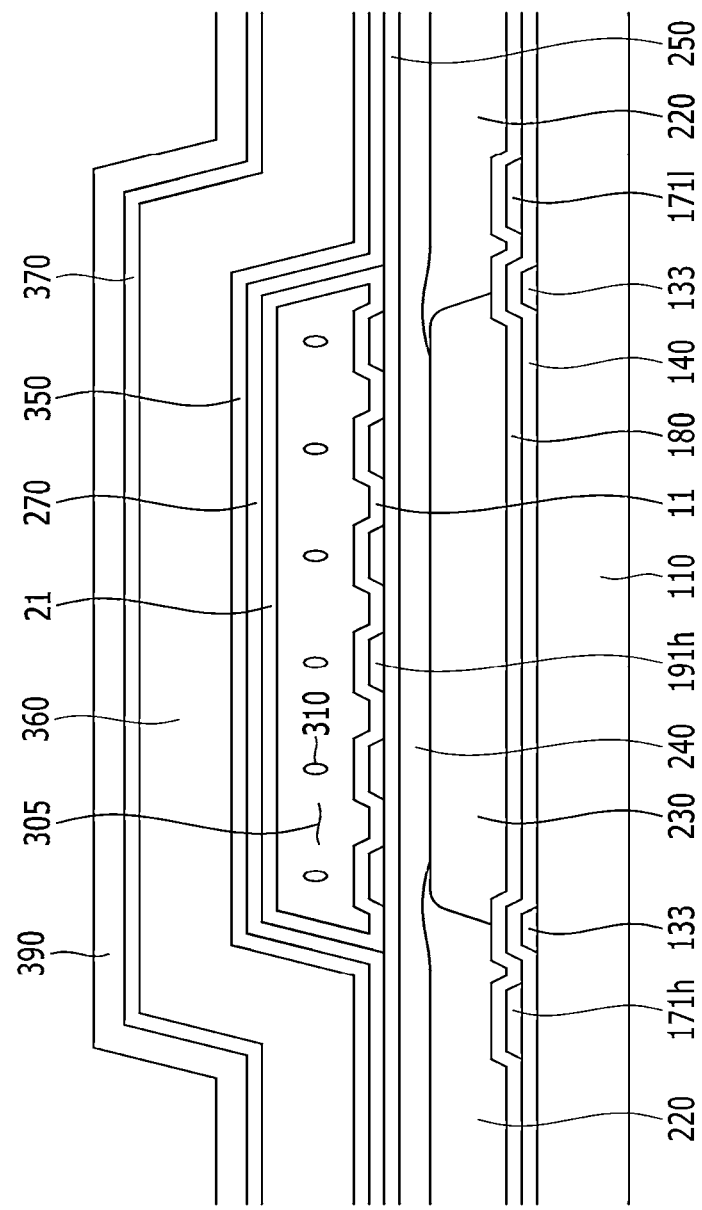
FIG. 5 is a cross-sectional view illustrating the display device in accordance with the exemplary embodiment of the present inventive concept taken along line V-V of FIG. 3.
Figure 6:
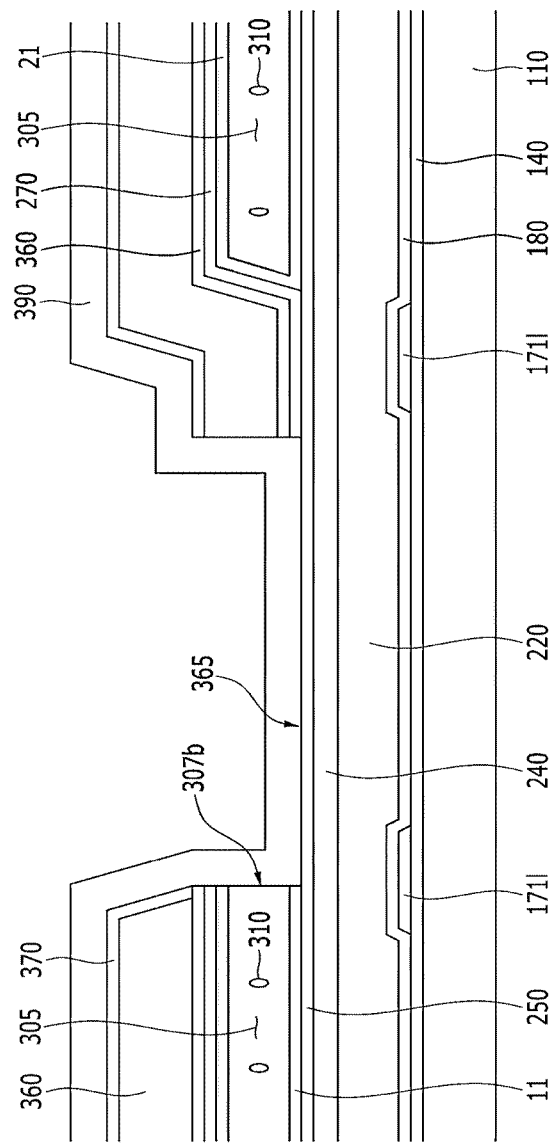
FIG. 6 is a cross-sectional view illustrating the display device in accordance with the exemplary embodiment of the present inventive concept taken along line VI-VI of FIG. 3.

FIG. 3 is a layout view illustrating a part of the display device in accordance with the exemplary embodiment, and FIG. 4 is a cross-sectional view of the display device in accordance with the exemplary embodiment taken along line IV-IV of FIG. 3. FIG. 5 is a cross-sectional view illustrating the display device in accordance with the exemplary embodiment taken along line V-V of FIG. 3, and FIG. 6 is a cross-sectional view illustrating the display device in accordance with the exemplary embodiment taken along line VI-VI of FIG. 3.

Referring to FIGS. 3 to 6, the gate line 121 and a first gate electrode 124h and a second gate electrode 124l protruding from the gate line 121 are formed on the substrate 110.

The gate line 121 extends in a horizontal direction, and transmits a gate signal. The gate line 121 is positioned between the two microcavities 305 that are adjacent in a column direction. The first gate electrode 124h and the second gate electrode 124l upwardly protrude in a plane view at an upper side of the gate line 121. The first gate electrode 124h and the second gate electrode 124l are connected to each other to form one protrusion, as shown in FIG. 3. However, this is not a limitation of the inventive concept, and the first gate electrode 124h and the second gate electrode 124l may be modified without departing from the spirit of the concept.

A storage electrode line 131 and storage electrodes 133 and 135 protruding from the storage electrode line 131 may be further formed on the substrate 110.

The storage electrode line 131 extends in a direction parallel to the gate line 121, and is formed to be spaced apart from the gate line 121. A constant voltage may be applied to the storage electrode line 131. The storage electrode 133 protruding from the storage electrode line 131 is formed in the first subpixel area PXa. The storage electrode 135 protruding from the storage electrode line 131 in a different direction (e.g., an opposite direction) than the storage electrode 133 is formed to be adjacent to the first gate electrode 124h and the second gate electrode 124l.

A gate insulating layer 140 is formed on the gate line 121, the first gate electrode 124h, the second gate electrode 124l, the storage electrode line 131, and the storage electrode 135. The gate insulating layer 140 may be formed of an inorganic insulating material, such as a silicon nitride (SiNx) and a silicon oxide (SiOx). Further, the gate insulating layer 140 may be formed of a single layer or a multilayer.

A first semiconductor 154h and a second semiconductor 154l are formed on the gate insulating layer 140. The first semiconductor 154h may be positioned on the first gate electrode 124h, and the second semiconductor 154l may be positioned on the second gate electrode 124l. The first semiconductor 154h may be elongated under the first data line 171h, and the second semiconductor 154l may be elongated under the second data line 171l. The first semiconductor layer 154h and the second semiconductor 154l may be formed of amorphous silicon, polycrystalline silicon, a metal oxide, or the like.

An ohmic contact member (not illustrated) may be formed on each of the first semiconductor 154h and the second semiconductor 154l. The ohmic contact members may be made of a silicide or a material such as n+ hydrogenated amorphous silicon on which an n-type impurity is doped at a high concentration.

The first data line 171h, the second data line 171l, a first source electrode 173h, a first drain electrode 175h, a second source electrode 173l, and a second drain electrode 175l are formed on the first semiconductor 154h, the second semiconductor 154l, and the gate insulating layer 140.

The first data line 171h and the second data line 171l transfer a data signal, and extend in a vertical direction to cross the gate line 121 and the storage electrode 131. The data line 171 is positioned between the two microcavities 305 which are adjacent in the row direction.

The first data line 171h and the second data line 171l transmit different data voltages. The data voltage transmitted by the second data line 171l is lower than the data voltage transmitted by the first data line 171h.

The first source electrode 173h is formed s to protrude toward the first gate electrode 124h from the first data line 171h, and the second source electrode 173l is formed to protrude toward the second gate electrode 124l from the second data line 171l. Each of the first drain electrode 175h and the second drain electrode 175l has one wide end portion and the other rod-shaped end portion. The wide end portions of the first drain electrode 175h and the second drain electrode 175l overlap the storage electrode 135 protruding from the storage electrode line 131. Each of the rod-shaped end portions of the first drain electrode 175h and the second drain electrode 175l is partially surrounded by the first source electrode 173h and the second source electrode 173l, respectively.

The first and second gate electrodes 124h and 124l, the first and second source electrodes 173h and 173l, and the first and second drain electrodes 175h and 175l form first and second thin film transistors (TFT) Qh and Ql together with the first and second semiconductors 154h and 154l, and channels of the thin film transistors are formed in the semiconductors 154h and 154l between the source electrodes 173h and 178l and the drain electrodes 175h and 175l, respectively.

A passivation layer 180 is formed on the first semiconductor 154h exposed between the first data line 171h, the second data line 171l, the first source electrode 173h, the first drain electrode 175h, the first source electrode 173h, and the first drain electrode 175h, and the second semiconductor 154l exposed between the second source electrode 173l, the drain electrode 175l, the second source electrode 173l, and the second drain electrode 175l. The passivation layer 180 may be formed of an organic insulating material or an inorganic insulating material, and may be formed of a single layer or a multilayer.

A color filter 230 is formed in each pixel PX on the passivation layer 180.

Each color filter 230 may display any one of primary colors, such as red, green, and blue. The color filter 230 is not limited to three primary colors or red, green, and blue, and may display cyan, magenta, yellow, and white-based colors.

A light blocking member 220 is formed in a region between adjacent color filters 230. The light blocking member 220 is formed on a boundary of the pixel PX and the thin film transistor to prevent light leakage. The color filter 230 and the light blocking member 220 may be overlapped with each other in a partial region.

A first insulating layer 240 may be further formed on the color filter 230 and the light blocking member 220. The first insulating layer 240 may be formed of an organic insulating material, and may serve to planarize the color filters 230.

A second insulating layer 250 may be further formed on the first insulating layer 240. The second insulating layer 250 may be formed of an inorganic insulating material, and may serve to protect the color filter 230 and the first insulating layer 240.

A first contact hole 181h through which the wide end portion of the first drain electrode 175h is exposed and a second contact hole 181l through which the wide end portion of the second drain electrode 175l is exposed are formed in the passivation layer 180, the first insulating layer 240, and the second insulating layer 250.

A pixel electrode 191 is formed on the second insulating layer 250. The pixel electrode 191 may be formed of a transparent metal material, such as indium-tin oxide (ITO) and indium-zinc oxide (IZO).

The pixel electrode 191 may be formed of a transparent metal material, such as indium-tin oxide (ITO) and indium-zinc oxide (IZO). The first subpixel electrode 191h and the second subpixel electrode 191l are disposed on and under the pixel PX based on the gate line 121 and the storage electrode line 131. The first sub-pixel electrode 191h is positioned in the first sub-pixel PXa and the second sub-pixel electrode 191l is positioned in the second sub-pixel PXb.

The first sub-pixel electrode 191h is connected to the first drain electrode 175h through the first contact hole 181h, and the second sub-pixel electrode 191l is connected to the second drain electrode 175l through the second contact hole 181l. Accordingly, when the first thin film transistor Qh and the second thin film transistor Ql are in an on-state, the first sub-pixel electrode 191h and the second sub-pixel electrode 191l receive different data voltages from the first drain electrode 175h and the second drain electrode 175l, respectively. An electric field may be formed between the pixel electrode 191 and a common electrode 270.

A general shape of each of the first sub-pixel electrode 191h and the second sub-pixel electrode 191l is a quadrangle, and the first sub-pixel electrode 191h and the second sub-pixel electrode 191l include cross-shaped stem portions formed by horizontal stem portions 193h and 193l and vertical stem portions 192h and 192l crossing the horizontal stem portions 193h and 193l. Further, each of the first sub-pixel electrode 191h and the second sub-pixel electrode 191l includes a plurality of micro-branch portions 194h and 194l.

The pixel electrode 191 is divided into four sub-regions by the horizontal stem portions 193h and 193l and the vertical stem portions 192h and 192l. The micro-branch portions 194h and 194l obliquely extend from the horizontal stem portions 193h and 193l and the vertical stem portions 192h and 192l, and the extension direction may form an angle of approximately 45° or 135° with the gate line 121 or the horizontal stem portions 193h and 193l. Further, the directions in which the micro-branch portions 194h and 194l in two adjacent sub-regions extend may be orthogonal to each other.

In the present exemplary embodiment, the first sub-pixel electrode 191h and the second sub-pixel electrode 191l may further include outer stem portions surrounding outer sides of the first sub-pixel PXa and the second sub-pixel PXb, respectively.

The disposition form of the pixel, the structure of the thin film transistor, and the shape of the pixel electrode described above are just one embodiment and the present inventive concept is not limited thereto.

The common electrode 270 is formed on the pixel electrode 191 so as to be spaced apart from the pixel electrode 191 by a predetermined distance. The microcavity 305 is formed between the pixel electrode 191 and the common electrode 270. That is, the microcavity 305 is surrounded by the pixel electrode 191 and the common electrode 270. The common electrode 270 is formed to contact the upper surface and the side of the microcavity 305. A width and an area of the microcavity 305 may be variously modified according to a size and resolution of the display device.

The common electrode 270 may be formed of a transparent metal such as indium-tin oxide (ITO) and indium-zinc oxide (IZO). A predetermined voltage may be applied to the common electrode 270, and an electric field may be formed between the pixel electrode 191 and the common electrode 270.

A first alignment layer 11 is formed on the pixel electrode 191. The first alignment layer 11 may also be formed right on the first insulating layer 240 which is not covered by the pixel electrode 191.

A second alignment layer 21 is formed under the common electrode 270 so as to face the first alignment layer 11.

The first alignment layer 11 and the second alignment layer 21 may be formed as vertical alignment layers, and may be formed of an alignment material such as polyamic acid, polysiloxane, and polyimide. The first and second alignment layers 11 and 21 may be connected on a side wall of the edge of the microcavity 305.

A liquid crystal layer formed of liquid crystal molecules 310 is formed in the microcavity 305 positioned between the pixel electrode 191 and the common electrode 270. The liquid crystal molecules 310 have negative dielectric anisotropy, and may be erected in a vertical direction on the substrate 110 in the absence of an electric field, in a vertical alignment mode.

The first sub-pixel electrode 191h and the second sub-pixel electrode 191l, to which the data voltage is applied, generate an electric field together with the common electrode 270 to determine an alignment direction of the liquid crystal molecules 310 positioned in the microcavity 305 between the two electrodes 191 and 270. Luminance of light passing through the liquid crystal layer is changed according to the thusly determined alignment direction of the liquid crystal molecules 310.

A third insulating layer 350 may be further formed on the common electrode 270. The third insulating layer 350 is formed on the common electrode 270. The third insulating layer 350 may be formed of an inorganic insulating material, such as a silicon nitride (SiNx) and a silicon oxide (SiOx), and may be omitted if necessary.

The roof layer 360 is formed on the third insulating layer 350. As described above, a plurality of openings 365 are formed in a roof layer 360, and may have a substantially rhombic planar shape. The roof layer 360 may have substantially the same plane pattern as the common electrode 270 and the third insulating layer 350. Accordingly, the common electrode 270 and the third insulating layer 350 are not formed at portions at which the openings 365 of the roof layer 360 are located.

The roof layer 360 is formed to cover an upper surface and a side of the microcavity 305. The roof layer 360 may be formed of an organic material. The roof layer 360 may be hardened by a hardening process to maintain the shape of the microcavity 305. That is, the roof layer 360 is formed to be spaced apart from the pixel electrode 191 with the microcavity 305 interposed therebetween.

The roof layer 360 located above the microcavities 305 is separated from the substrate 110, and the roof layer located between the adjacent microcavities 305 is attached to the substrate 110. In the present exemplary embodiment, it is possible to make the structure of microcavities 305 more durable by increasing the area of the substrate 110 to which the roof layer 360 is attached.

The height of the roof layer 360 located above the microcavities 305 may be higher than the height of the roof layer 360 located between the adjacent microcavities 305. This does not necessarily mean the thickness of the roof layer 360 is greater above the microcavities 305; rather, the difference in height is at least partially due to the presence of a "dip" between adjacent microcavities 305. In fact, the roof layer 360 may be formed to have a substantially constant thickness. Recently, a curved display has been developed. In the present exemplary embodiment, the roof layer 360 located between the adjacent microcavities 305 may be formed at a lower height to reduce a force acting between the roof layers 360 located above different microcavities 305 in the curved display, thereby improving the flexibility.

However, as the present exemplary embodiment is not limited to a curved display application, the roof layer may be formed to have a constant height regardless of its position. In this case, the thickness of the roof layer 360 located between the microcavities 305 may be greater than that of the roof layer 360 located above the microcavities 305 to fill in the "dip."

The common electrode 270 and the roof layer 360 are formed to expose the side surface of the microcavity 305, and portions where the microcavity 305 is not covered by the common electrode 270 and the roof layer 360 form the injection holes 307a and 307b. The injection holes 307a and 307b include the first injection hole 307a, through which a lateral surface of a first edge of the microcavity 305 is exposed, and the second injection hole 307b, through which a lateral surface of a second edge of the microcavity 305 is exposed. The first injection hole 307a and the second injection hole 307b are formed to face each other. The injection holes 307a and 307b expose side surfaces of the microcavity 305 that is adjacent to the opening 365. The microcavities 305 are exposed by the injection holes 307a and 307b, so that an alignment solution, a liquid crystal material, or the like may be injected into the microcavities 305 through the injection holes 307a and 307b.

A fourth insulating layer 370 may be further formed on the roof layer 360. The fourth insulating layer 370 may be made of an inorganic insulating material such as a silicon nitride (SiNx) and a silicon oxide (SiOx). The fourth insulating layer 370 may be formed to cover the top and the side of the roof layer 360. The fourth insulating layer 370 serves to protect the roof layer 360 made of an organic material, and may be omitted if necessary.

An encapsulation layer 390 may be formed on the fourth insulating layer 370. The encapsulation layer 390 is formed to cover the injection hole 307 where a part of the microcavity 305 is exposed to the outside. That is, the encapsulation layer 390 may seal the microcavity 305 so that the liquid crystal molecules 310 formed in the microcavity 305 are not discharged to the outside. The encapsulation layer 390 contacts the liquid crystal molecules 310, and as a result, the encapsulation layer 390 may be made of a material that does not react with the liquid crystal molecules 310. For example, the encapsulation layer 390 may be made of parylene and the like.

The encapsulation layer 390 may be formed by a multilayer such as a double layer and a triple layer. The double layer is configured by two layers made of different materials.

The triple layer is configured by three layers, and materials of adjacent layers are different from each other. For example, the encapsulation layer 390 may include a layer made of an organic insulating material or a layer made of an inorganic insulating material.

Although not illustrated, polarizers may be further formed on the upper and lower sides of the display device. The polarizers may be configured by a first polarizer and a second polarizer. The first polarizer may be attached onto the lower side of the substrate 110, and the second polarizer may be attached onto the encapsulation layer 390.

Hereinafter, a display device in accordance with an exemplary embodiment will be described with reference to FIG. 7 and FIG. 8.

Figure 7:
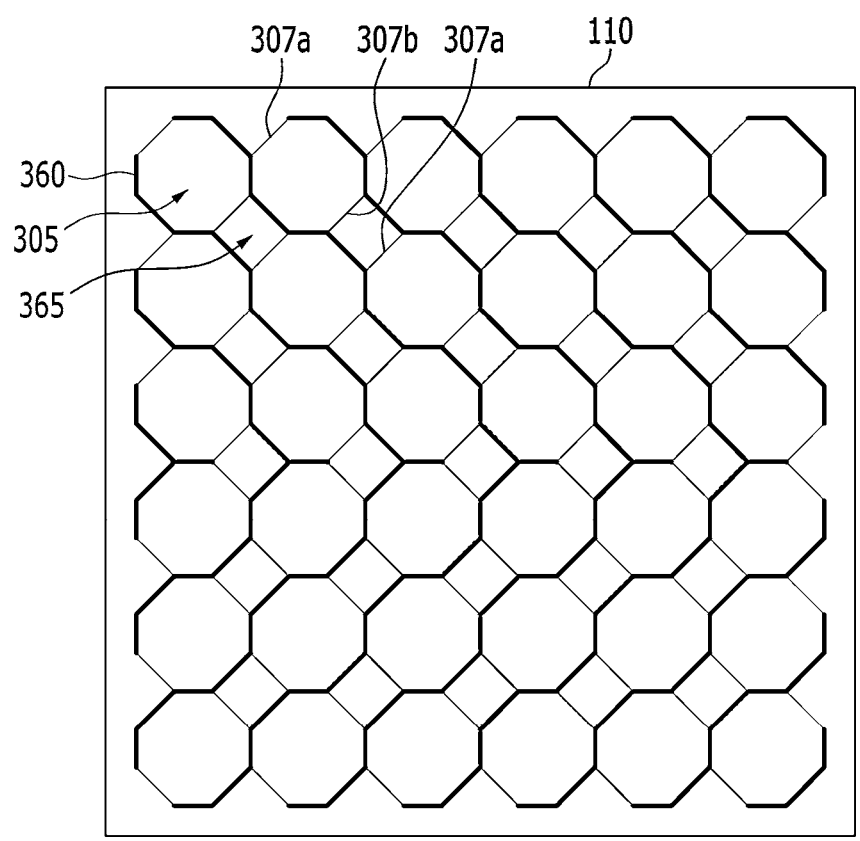
FIG. 7 and FIG. 8 are top plan views illustrating a display device in accordance with an exemplary embodiment of the present inventive concept.
Figure 8:
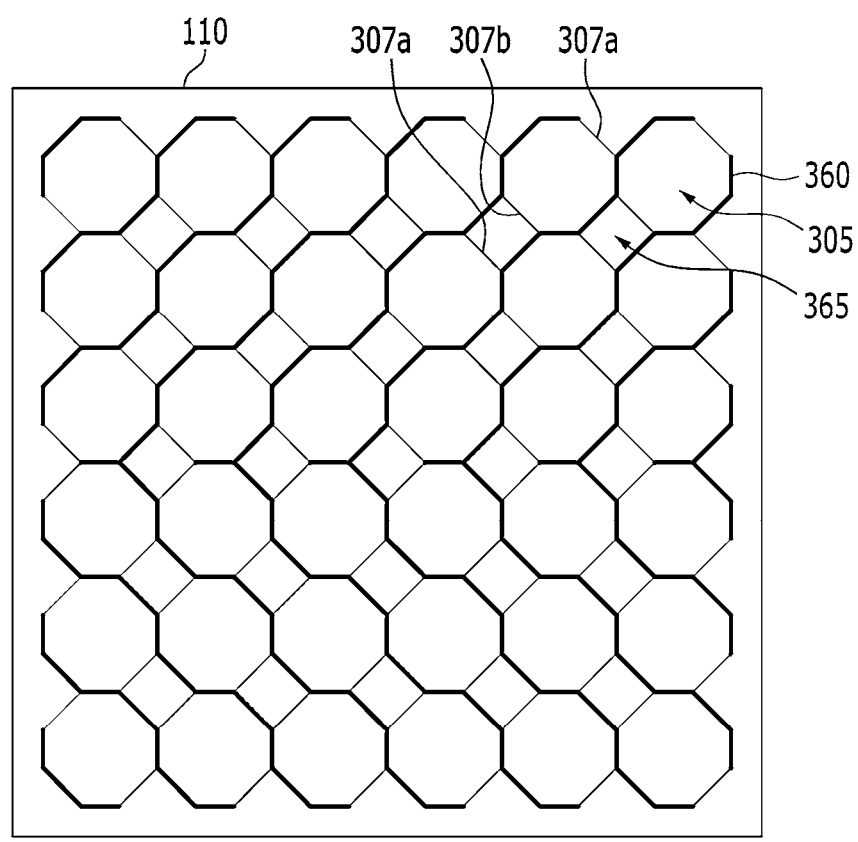

Since the display device in accordance with the exemplary embodiment of the present inventive concept illustrated in FIG. 7 and FIG. 8 is almost the same as the display device in accordance with the exemplary embodiment of the present inventive concept illustrated in FIG. 1 to FIG. 6, the overlapping description thereof will be omitted. The present exemplary embodiment is different from the above exemplary embodiment where the first injection hole and the second injection hole are respectively formed at the same positions for each microcavity, in that the first injection hole and the second injection hole are respectively formed at different positions according to a position of the microcavity. This will be described later in more detail.

FIG. 7 and FIG. 8 are top plan views illustrating the display device in accordance with the exemplary embodiment of the present inventive concept.

A plurality of microcavities 305 covered by roof layers 360 are formed on the substrate 110. The microcavities 305 may have a substantially octagonal planar shape, and may be disposed in a matrix form. In the embodiments of FIG. 7 and FIG. 8, a total of 36 microcavities 305 are formed by disposing 6 microcavities 305 in the row direction and 6 microcavities 305 in the column direction. However, this exact configuration is not a limitation of the inventive concept, and the shape, disposal form, and number of the microcavities 305 may be changed.

A plurality of openings 365 are formed in the roof layers 360. The openings 365 may have a substantially rhombic planar shape, and may be disposed in a matrix form. In FIG. 7 and FIG. 8, a total of 25 openings 365 are formed by disposing 5 openings 365 in the row direction and 5 openings 365 in the column direction. However, this inventive concept is not limited thereto, and the shape, disposal form, and number of the openings 365 may be changed.

The microcavities 305 are partially exposed to the outside at portions that contact the openings 365. The roof layer 360 is formed to cover upper surfaces and one part of side surfaces of the microcavities 305, and the roof layer 360 is formed to not cover the other parts of the side surfaces of the microcavities 305. The microcavities 305 are exposed to the outside at regions at which the side surfaces of the microcavities 305 are not covered by the roof layer 360. As such, parts at which the microcavities 305 are exposed to the outside are referred to as injection holes 307a and 307b.

Each of the microcavities 305 has a first side surface and a second side surface that face each other, and a third side surface and a fourth side surface that face each other. For example, the microcavity 305 has an octagonal planar shape including a top side, a bottom side, a left side, and a right side. The microcavity may further include a first side that connects the top side and the left side, a second side that connects the bottom side and the right side, a third side that connects the top side and the right side, and a fourth side that connects the bottom side and the left side. In this case, a first side surface, a second side surface, a third surface, and a fourth side surface are respectively located at the first side, the second side, the third side, and the fourth side.

The injection holes 307a and 307b are respectively formed on opposite sides of the microcavity 305. The injection holes 307a and 307b include a first injection hole 307a and a second injection hole 307b.

In FIG. 7, in the case of the microcavities located at a first row to a third row, the first injection hole 307a is formed to expose a first side surface of the microcavity 305, and the second injection hole 307b is formed to expose a second side surface of the microcavity 305. In this case, the first injection hole 307a and the second injection hole 307b are formed to face each other. The roof layer 360 is formed to not cover the first side surface and the second side surface of the microcavity 305 in which the injection holes 307a and 307b are respectively formed, and is formed to cover the remaining surfaces thereof except the first side surface and the second side surface.

Similarly, in the case of the microcavities located at a fourth row to a sixth row, the first injection hole 307a is formed to expose a third side surface of the microcavity 305, and the second injection hole 307b is formed to expose a fourth side surface of the microcavity 305. In this case, the first injection hole 307a and the second injection hole 307b are also formed to face each other. The roof layer 360 is formed to not cover the third side surface and the fourth side surface of the microcavity 305 in which the injection holes 307a and 307b are respectively formed, and is formed to cover the remaining surfaces thereof except the third side surface and the fourth side surface.

In the present exemplary embodiment, the positions at which the injection holes 307a and 307b are formed are changed according to the position of the microcavity 305. Accordingly, it is possible to further disperse spots by varying the formation positions of the injection holes 307a and 307b in a predetermined cycle. As described above, the positions of the injection hole 307a and 307b are changed in the cycle of 3 rows, but the present exemplary embodiment is not limited thereto. The cycle of the position change of the injection holes 307a and 307b may be variously changed.

The display device shown in FIG. 8 has an inverse structure to the display device of FIG. 8.

In FIG. 8, in the case of the microcavities located at a first row to a third row, the first injection hole 307a is formed to expose a third side surface of the microcavity 305, and the second injection hole 307b is formed to expose a fourth side surface of the microcavity 305. In this case, the first injection hole 307a and the second injection hole 307b are also formed to face each other. The roof layer 360 is formed to not cover the third side surface and the fourth side surface of the microcavity 305 in which the injection holes 307a and 307b are respectively formed, and is formed to cover the remaining surfaces thereof except the third side surface and the fourth side surface.

Similarly, in the case of the microcavities located at a fourth row to a sixth row, the first injection hole 307a is formed to expose a first side surface of the microcavity 305, and the second injection hole 307b is formed to expose a second side surface of the microcavity 305. In this case, the first injection hole 307a and the second injection hole 307b are formed to face each other. The roof layer 360 is formed to avoid covering the first side surface and the second side surface of the microcavity 305 in which the injection holes 307a and 307b are respectively formed, and is formed to cover the remaining surfaces.

Hereinafter, a display device in accordance with another exemplary embodiment will be described with reference to FIG. 9.

Figure 9:
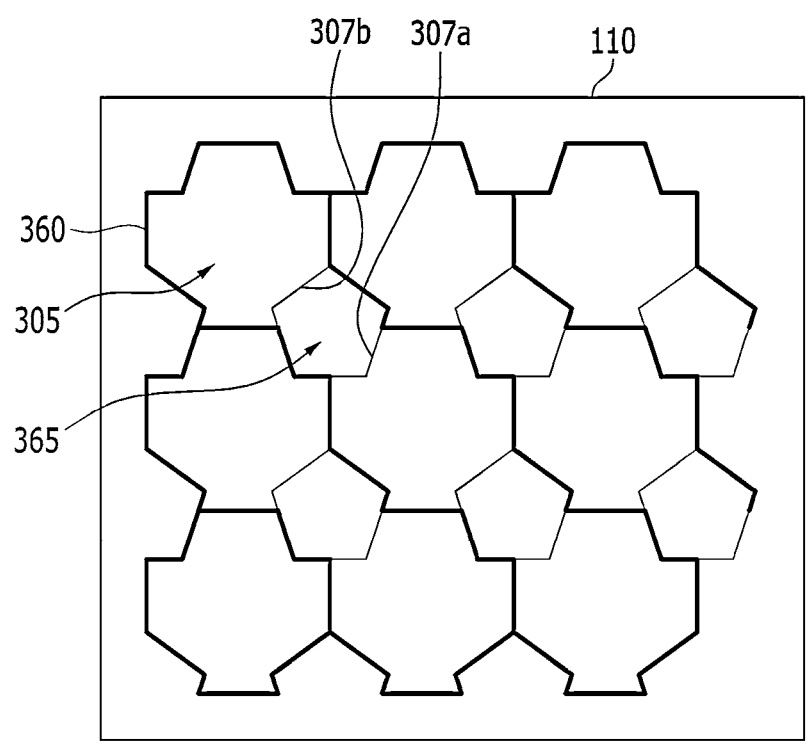
FIG. 9 is a top plan view illustrating the display device in accordance with the exemplary embodiment of the present inventive concept.

Since the display device in accordance with the exemplary embodiment illustrated in FIG. 9 is almost the same as the display device in accordance with the exemplary embodiment of FIG. 1 to FIG. 6, the overlapping description thereof will be omitted. The present exemplary embodiment is different from the above exemplary embodiment where the openings of the roof layer have the rhombic planar shape, in that the openings of the roof layer have a pentagonal planar shape. This will be described later in more detail.

FIG. 9 is a top plan view illustrating the display device in accordance with an exemplary embodiment of the inventive concept.

A plurality of microcavities 305 covered by roof layers 360 are formed on the substrate 110, and a plurality of openings 365 are formed in a roof layer 360. The boundaries of the microcavity 305 and the opening 365 are in contact with each other. Accordingly, when the planar shape of the opening 365 is changed, the planar shape of the microcavity 305 is also changed.

In the present exemplary embodiment, as shown in FIG. 9, the openings 365 of the roof layer 360 have the pentagonal planar shape. Accordingly, the microcavities 305 have a dodecagonal planar shape.

The planar shape of the openings 365 of the roof layer 360 may have various polygonal shapes without being limited the rhombus or the pentagon explicitly described herein. Accordingly, the planar shape of the openings 365 may be variously changed.

Hereinafter, a display device in accordance with yet another exemplary embodiment will be described with reference to FIG. 10.

Figure 10:
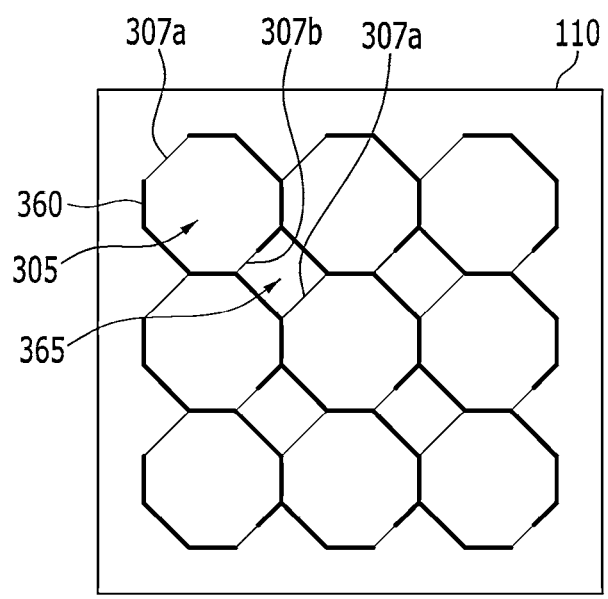
FIG. 10 is a top plan view illustrating the display device in accordance with another exemplary embodiment of the present inventive concept.

Since the display device in accordance with the exemplary embodiment of the present inventive concept illustrated in FIG. 10 is almost the same as the display device in accordance with the exemplary embodiment of FIG. 1 to FIG. 6, any redundant description will be omitted. The present exemplary embodiment is different from the above exemplary embodiment where there is symmetry between the first injection hole and the second injection hole, in that there is asymmetry between the first injection hole and the second injection hole. This will be described later in more detail.

FIG. 10 is a top plan view illustrating the display device in accordance with the exemplary embodiment of the present inventive concept.

The injection holes 307a and 307b are respectively formed at opposite edges of the microcavity 305. The injection holes 307a and 307b include a first injection hole 307a and a second injection hole 307b, the first injection hole 307a is formed to expose a first side surface of the microcavity 305, and the second injection hole 307b is formed to expose a second side surface of the microcavity 305. The first side surface and the second side surface of the microcavity 305 are formed to face each other. Accordingly, the first injection hole 307a and the second injection hole 307b are formed to face each other.

In the present exemplary embodiment, the first injection hole 307a is formed to expose a part of the first side surface of the microcavity 305, and the second injection hole 307b is formed on an entire part of the side surface of the microcavity 305. In other words, as shown in FIG. 9, the sidewall parts of the opening 365 that interface each of the two opposing microcavities 305 are formed into an injection hole 307a/b. In the embodiment of FIG. 9 where the opening 365 has a pentagonal shape but is surrounded by four microcavities 365, Accordingly, the size of the second injection hole 307b is smaller than that of the first injection hole 307a. As a result, the first injection hole 307a and the second injection hole 307b are asymmetrical with each other and different in size.

Hereinafter, a display device in accordance with yet another exemplary embodiment will be described with reference to FIG. 11.

Figure 11:
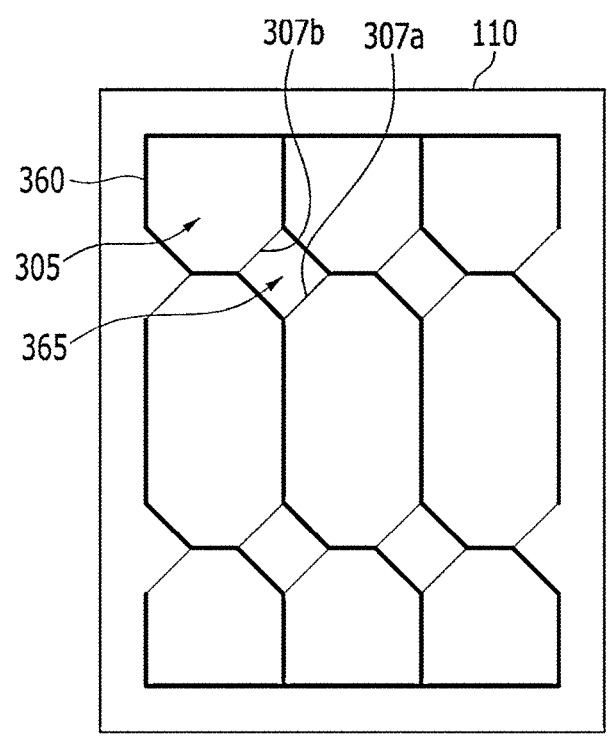
FIG. 11 is a top plan view illustrating the display device in accordance with yet another exemplary embodiment of the present inventive concept.

Since the display device in accordance with the exemplary embodiment of FIG. 11 is almost the same as the display device in accordance with the exemplary embodiment illustrated in FIG. 1 to FIG. 6, any redundant description will be omitted. The present exemplary embodiment is different from the above exemplary embodiment in which the microcavities have a regular octagonal shape, in that the microcavities have an irregular octagonal shape with sides of different lengths. This will be described later in more detail.

FIG. 11 is a top plan view illustrating the display device in accordance with the exemplary embodiment of the present inventive concept.

A plurality of microcavities 305 covered by roof layers 360 are formed on the substrate 110. The microcavities 305 may have a substantially octagonal shape, and may be disposed in a matrix form.

In the aforementioned exemplary embodiment, the microcavities 305 have a regular octagonal shape with each side of the same length. However, in the present exemplary embodiment, the microcavities 305 have the octagonal planar shape with sides of different lengths. Particularly, a left side and a right side of the octagon are formed to be longer than the other sides. Accordingly, the planar shape of the microcavities 305 may have an octagon that is elongated in one direction. A display device adopting the elongated structure of the present exemplary embodiment may be appropriate for a configuration where two subpixels are disposed in one microcavity 305.

Hereinafter, a display device in accordance with yet another exemplary embodiment will be described with reference to FIG. 12.

Figure 12:
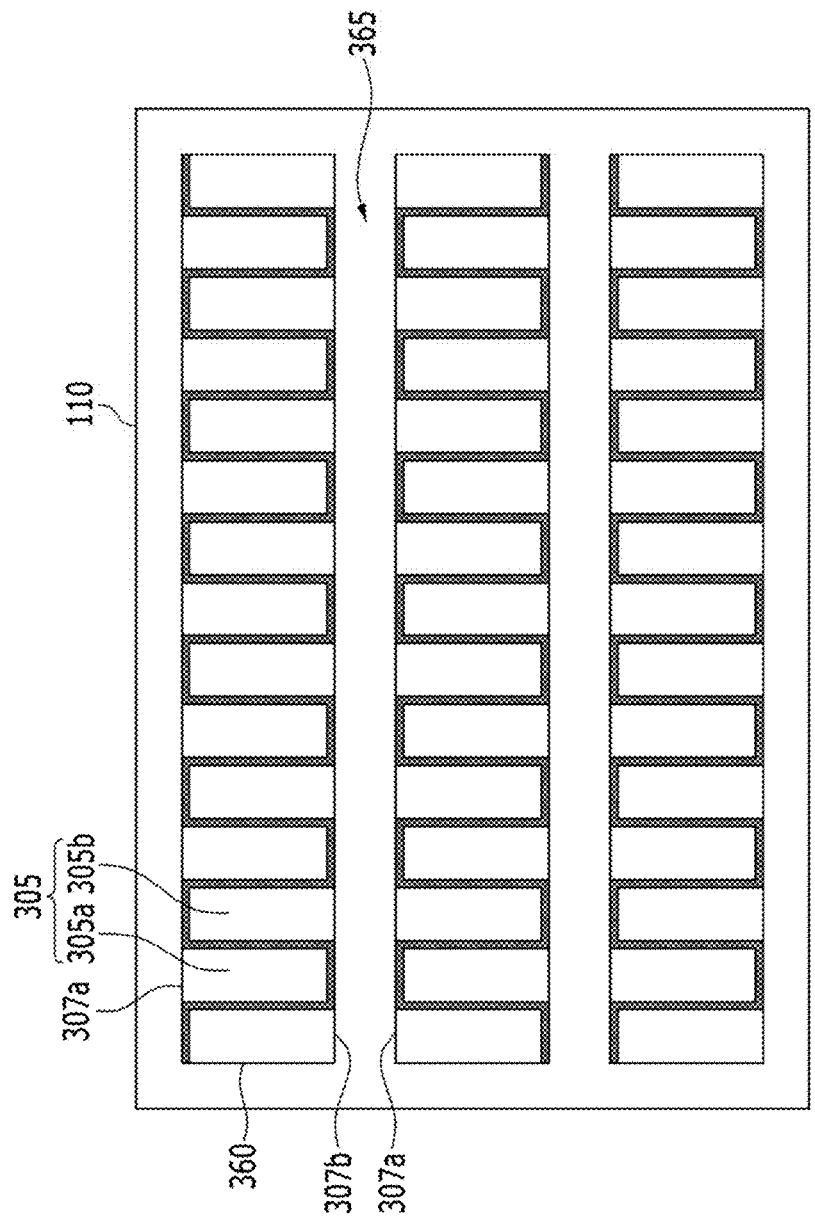
FIG. 12 is a top plan view illustrating the display device in accordance with yet another exemplary embodiment of the present inventive concept.

Since the display device in accordance with the exemplary embodiment of FIG. 12 is almost the same as the display device in accordance with the exemplary embodiment of FIG. 1 to FIG. 6, any redundant description will be omitted. The present exemplary embodiment is different from the above exemplary embodiment where two injection holes are formed in one microcavity. In the embodiment of FIG. 12, one injection hole is formed in one microcavity. This will be described later in more detail.

FIG. 12 is a top plan view illustrating the display device in accordance with the exemplary embodiment of the present inventive concept.

A plurality of microcavities 305 covered by roof layers 360 are formed on the substrate 110. The microcavities 305 may have a substantially quadrangular planar shape. The microcavities 305 may be disposed in a row direction and a column direction. As a result, the microcavities 305 may be disposed in a matrix form.

Each of the microcavities 305 includes a first microcavity 305a and a second microcavity 305b. The first microcavity 305a and the second microcavity 305b are alternately arranged in the row direction and the column direction. For example, as shown in FIG. 12, in the case of the microcavities 305 disposed at a first row, the second microcavity 305b, the first microcavity 305a, the second microcavity 305b, and the first microcavity 305a are repeatedly disposed in that order. Similarly, in the case of the microcavities 305 disposed at a first column, the second microcavity 305b, the first microcavity 305a, and the second microcavity 305b are repeatedly disposed in that order.

The openings 365 may be formed in the roof layer 360. No microcavity 305 is formed at portions at which the openings 365 are located. The openings 365 may have a substantially bar-like planar shape. The openings 365 may be formed to extend in the row direction. The openings 365 are disposed between the adjacent microcavities 305 in the column direction.

The microcavities 305 are partially exposed at portions that interface the openings 365. The roof layer 360 is formed to avoid covering a side surface of the microcavity 305, and is formed to cover a top surface and the remaining side surfaces of the microcavity 305. The microcavities 305 are exposed at regions where the side surfaces of the microcavities 305 are not covered by the roof layer 360. As such, parts at which the microcavities 305 are exposed to the outside are referred to as injection holes 307a and 307b.

The injection holes 307a and 307b include a first injection hole 307a and a second injection hole 307b. One of the first injection hole 307a and the second injection hole 307b is formed at each of the microcavities 305. Each of the microcavities 305 has a first side surface and a second side surface that face each other. The first injection hole 307a may be formed to expose the first side surface of the first microcavities 305a, and the second injection hole 307b may be formed to expose the second side surface of the second microcavity 305b. The second side surface of the first microcavity 305a is covered by the roof layer 360, and the first side surface of the second microcavity 305b is covered by the roof layer 360.

Since the first microcavity 305a and the second microcavity 305b are alternately arranged in the column direction, the first injection hole 307a and the second injection hole 307b are formed to face each other with the opening 365 of the roof layer 360 therebetween.

Liquid crystal layers having different properties may be formed in the microcavities 305 that are adjacent to each other in the row direction. For example, a first liquid crystal layer made of a first liquid crystal material may be formed in the microcavity 305 located at a first row and a first column, and a second liquid crystal layer made of a second liquid crystal material may be formed in the microcavity 305 located at the first row and a second column. In this case, the first liquid crystal material and the second liquid crystal material have different properties. For example, the first liquid crystal material and the second liquid crystal material may be different from each other in response speed or transmittance. In this case, even when one pixel at which the first liquid crystal layer is formed and another pixel at which the second liquid crystal layer are driven with the same voltage, luminance levels of light passing through the two pixels since the first liquid crystal material and the second liquid crystal material have different properties. In this way, it is possible to improve the visibility.

As described above, the liquid crystal layers made of liquid crystal materials having different properties have been described to be formed in different microcavities 305, but the present inventive concept is not limited thereto.

Layers of different materials as well as the liquid crystal layers may be formed in the microcavities 305. For example, an organic light emitting material layer made of an organic light emitting material may be formed therein. An organic light emitting material made of a liquid as an organic material having a self-luminance characteristic may be injected into the microcavities 305. As another example, a quantum dot material layer made of quantum dots is possible. The quantum dots are well-known nano-material having a characteristic by which smaller particles emit light having shorter wavelengths, while lager particles emit light having longer wavelengths. Accordingly, by adjusting the size of particles, it is possible to emit light having a desired wavelength range in a visible ray region.

Hereinafter, a method for manufacturing a display device in accordance with an exemplary embodiment will be described with reference to FIG. 13 to FIG. 15.

Figure 13:
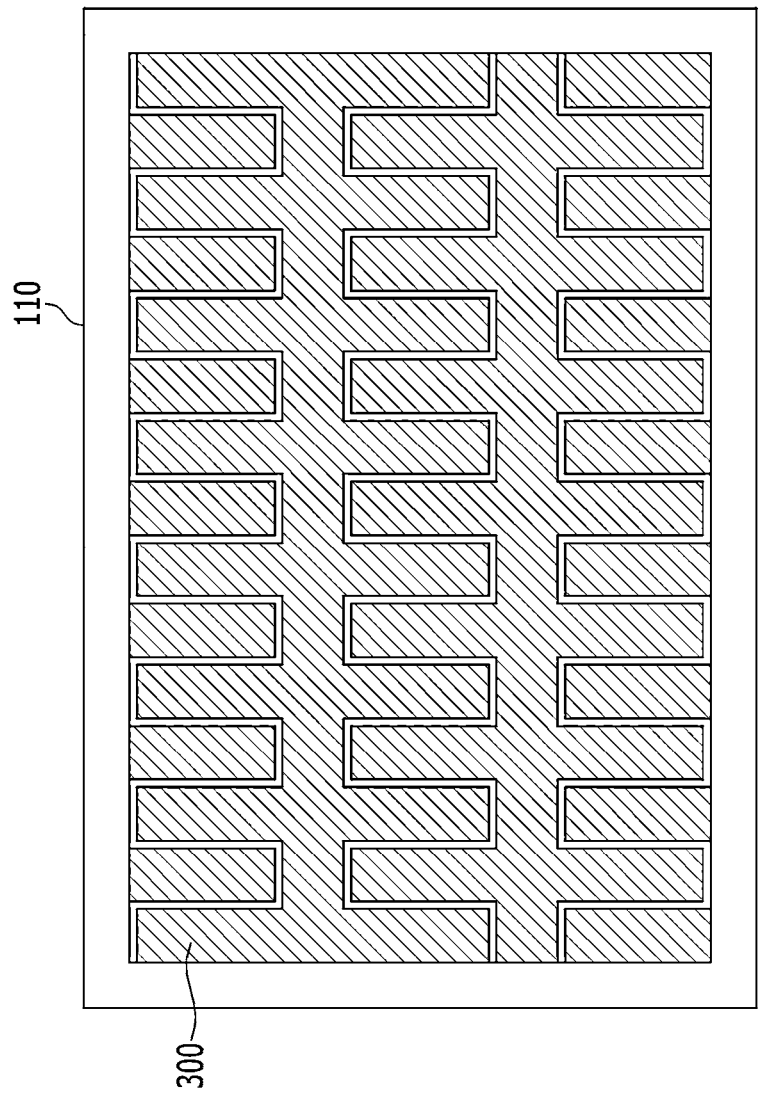
FIG. 13 to FIG. 15 are stepwise top plan views showing a manufacturing method of a display device in accordance with an exemplary embodiment of the present inventive concept.
Figure 14:
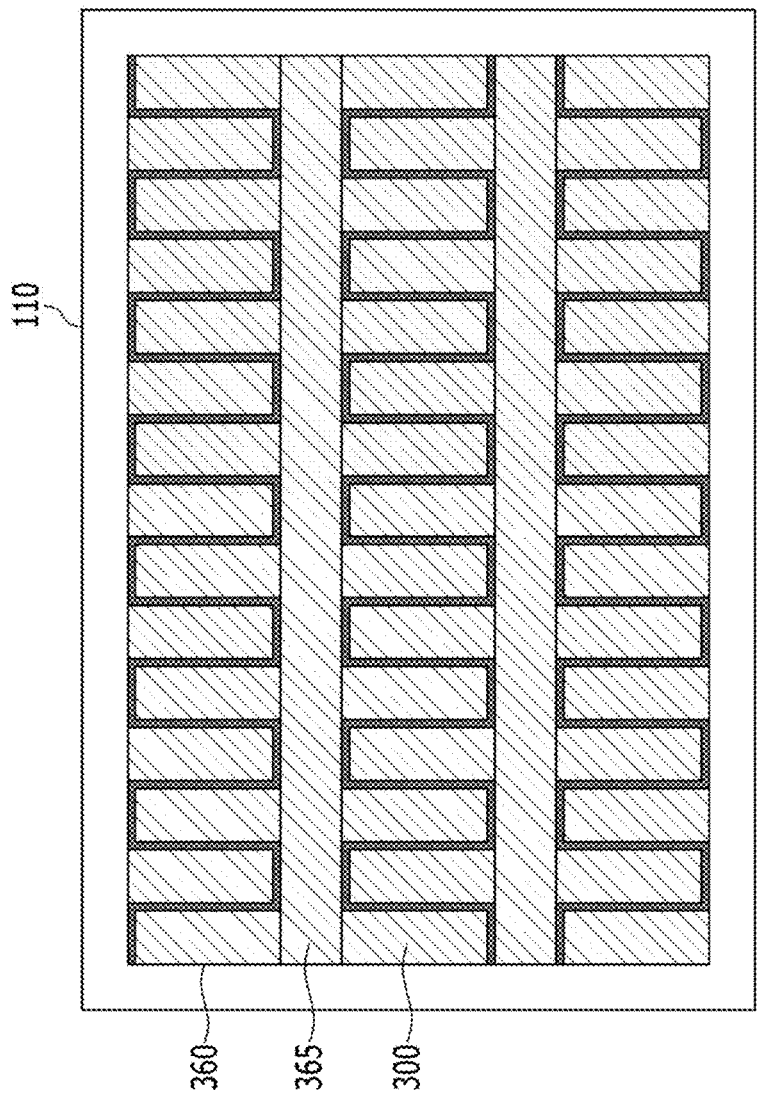
Figure 15:
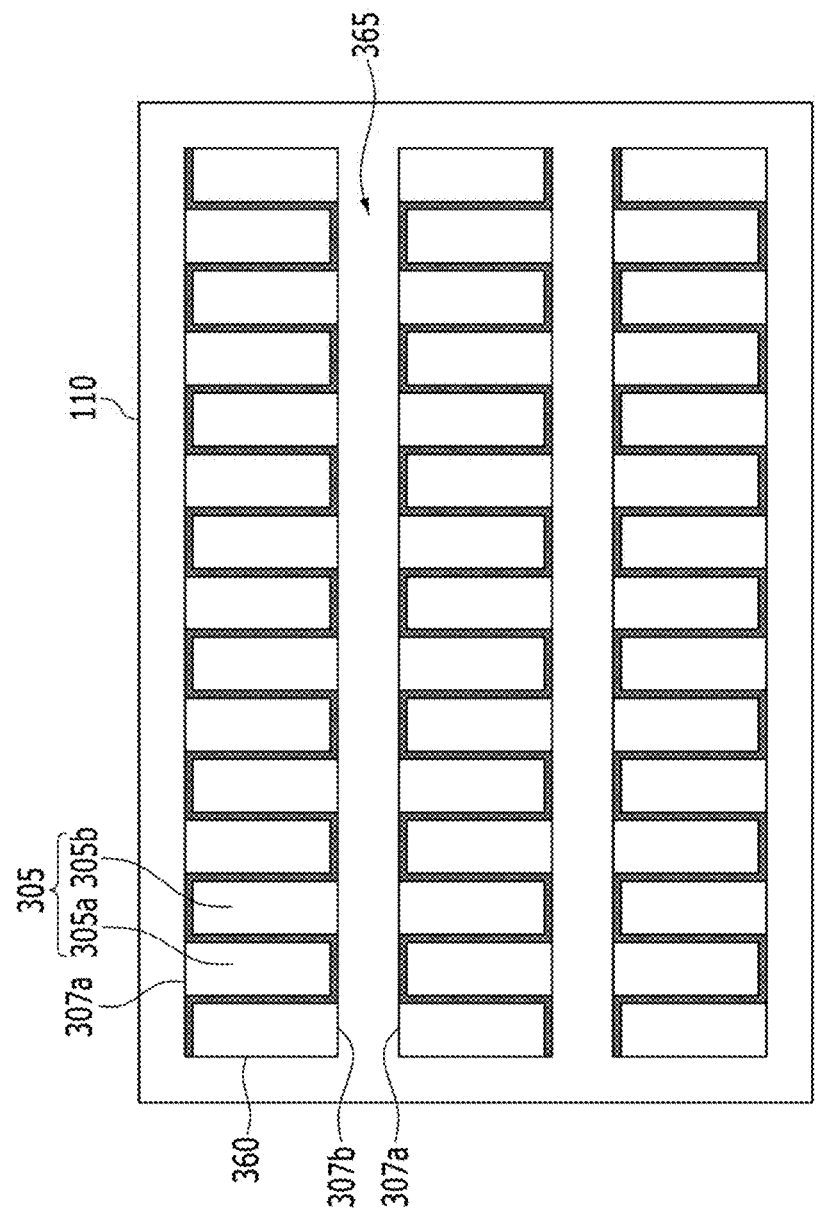

FIG. 13 to FIG. 15 are stepwise top plan views showing a manufacturing method of a display device in accordance with an exemplary embodiment. FIG. 13 to FIG. 15 briefly show only some constituent elements without illustration of thin film transistors, pixel electrodes, common electrodes, and the like. The following descriptions are only related to processes for forming roof layers, microcavities, injection holes, and the like.

As shown in FIG. 13, a photosensitive organic material is first coated on a substrate 110 to form a sacrificial layer 300 through a photolithography process. In FIG. 13, shaded portions indicate the sacrificial layer 300. The sacrificial layer 300 may be formed by connecting H-shaped members to each other.

As shown in FIG. 14, a roof layer 360 is formed on the sacrificial layer 300, and the roof layer 360 is patterned to form openings 365. Specifically, the roof layer 360 is formed to extend in a row direction, and the roof layer is patterned to form the openings 365 that extend in the row direction to have a bar-like shape. The roof layer 360 may be formed to cover a top surface and a side surface of the sacrificial layer 300. While the sacrificial layer 300 is formed, the roof layer 360 is also formed at a portion where the photosensitive organic material is removed through the photolithography process, and the side surface of the sacrificial layer 300 is covered at the portion by the roof layer 360.

As shown in FIG. 15, the sacrificial layer 300 is completely removed by applying a developer or a stripper solution, or by using an ashing process. Once the sacrificial layer 300 is removed, microcavities 305 are formed at the portions from which the sacrificial layer 300 has been formed. With the removal of the sacrificial layer 300, parts that interface the openings 365 of the roof layer 360 become injection holes 307*a* and 307*b*.

Next, liquid material is injected into the microcavities 305 by being dripped into the openings 365. Two openings 365 are shown in FIG. 15, and liquid materials having different properties may be supplied to the two openings 365. When a first liquid crystal material is supplied to a first opening 365, the first liquid crystal material is injected into the microcavities 305 located at an odd-numbered column among the microcavities 305 located at a first row and a second row. Similarly, when a second liquid crystal material is supplied to a second opening 365, the second liquid crystal material is injected into the microcavities 305 located at an even-numbered column among the microcavities 305 located at the second row and a third row. In this case, the liquid crystal materials having different properties are injected into the microcavities 305 that are adjacent to each other.

Figure 16:
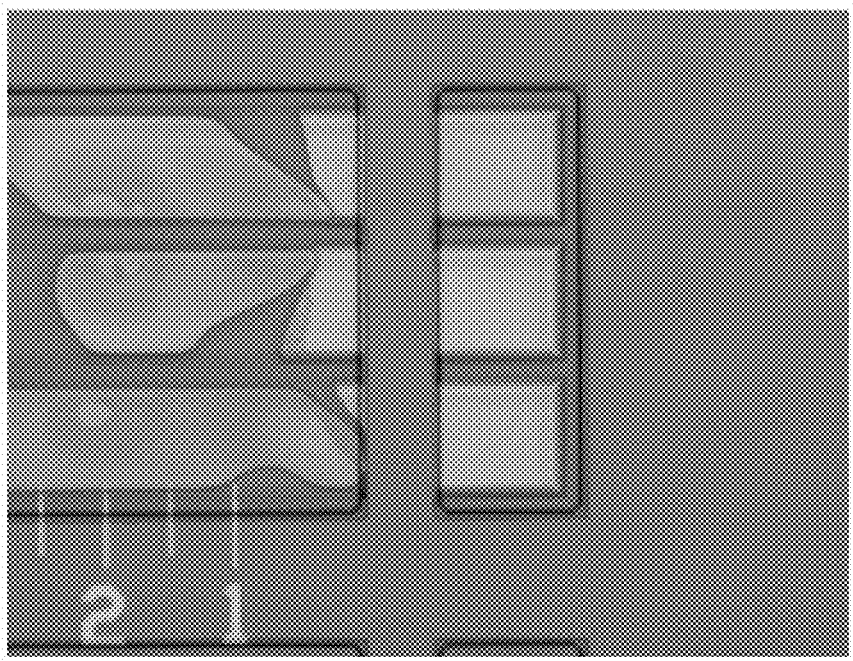
FIG. 16 shows a test result observed by removing a sacrificial layer from a structure in which one injection hole is formed in one microcavity.

In the present exemplary embodiment, one injection hole may be formed in one microcavity. Removal of the sacrificial layer may be performed by referring to an image such as what is shown in FIG. 16. FIG. 16 shows a test result observed by removing a sacrificial layer from a structure in which one injection hole is formed in one microcavity.

Hereinafter, a display device in accordance with an exemplary embodiment will be described with reference to FIG. 17.

Figure 17:
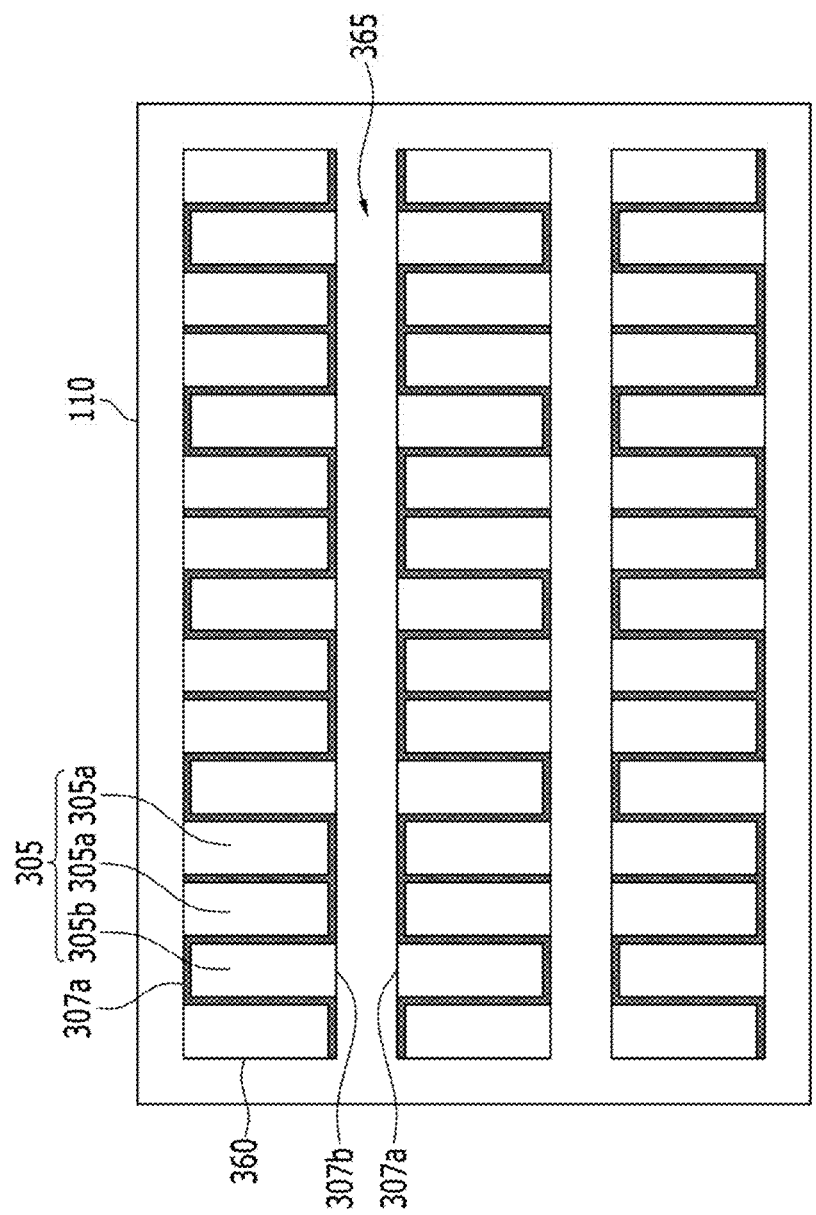
FIG. 17 is a top plan view illustrating the display device in accordance with the exemplary embodiment of the present inventive concept.

Since the display device in accordance with the exemplary embodiment of FIG. 17 is almost the same as the display device in accordance with the exemplary embodiment of FIG. 12, any redundant description will be omitted. The present exemplary embodiment is different from the above embodiment where the first microcavity and the second microcavity are alternatively disposed. In this embodiment, one first microcavity and two second microcavities are alternatively disposed, or vice versa. This will be described later in more detail.

FIG. 17 is a top plan view illustrating the display device in accordance with the exemplary embodiment of the present inventive concept.

A plurality of microcavities 305 covered by roof layers 360 are formed on the substrate 110. The microcavities 305 may have a substantially quadrangular planar shape, and may be disposed in a row direction and a column direction.

Each of the microcavities 305 includes a first microcavity 305*a* and a second microcavity 305*b*. The first microcavity 305*a* and the second microcavity 305*b* are alternately arranged in the row direction and the column direction. In FIG. 17, in the case of the microcavities 305 disposed at the first row, two first microcavities 305*a* and one second microcavity 305*b* are repeatedly disposed in that order. In the second row, one first microcavity 305*a* and two second microcavities 305*b* are repeatedly disposed in that order. In the third row, two first microcavities 305*a* and one second microcavity 305*b* are repeatedly disposed in that order.

In this case, the first microcavity 305*a* and the second microcavity 305*b* are disposed to be vertically adjacent to each other. Accordingly, the first injection hole 307*a* and the second injection hole 307*b* are formed to face each other with the opening 365 of the roof layer 360 between them.

Liquid crystal materials having different properties are respectively injected into the first microcavities 305*a* and the second microcavities 305*b* in the same row. For example, the liquid crystal materials having different properties are respectively injected into the microcavities in which blue pixels are formed and the microcavities in which the red and green pixels are formed. In general, a red filter and a green filter have similar thicknesses, but are different from a blue filter in thickness. Accordingly, the difference in a cell gap may be generated, but this can be compensated by injecting liquid crystal materials having different properties.

Hereinafter, a display device in accordance with an exemplary embodiment will be described with reference to FIG. 18.

Figure 18:
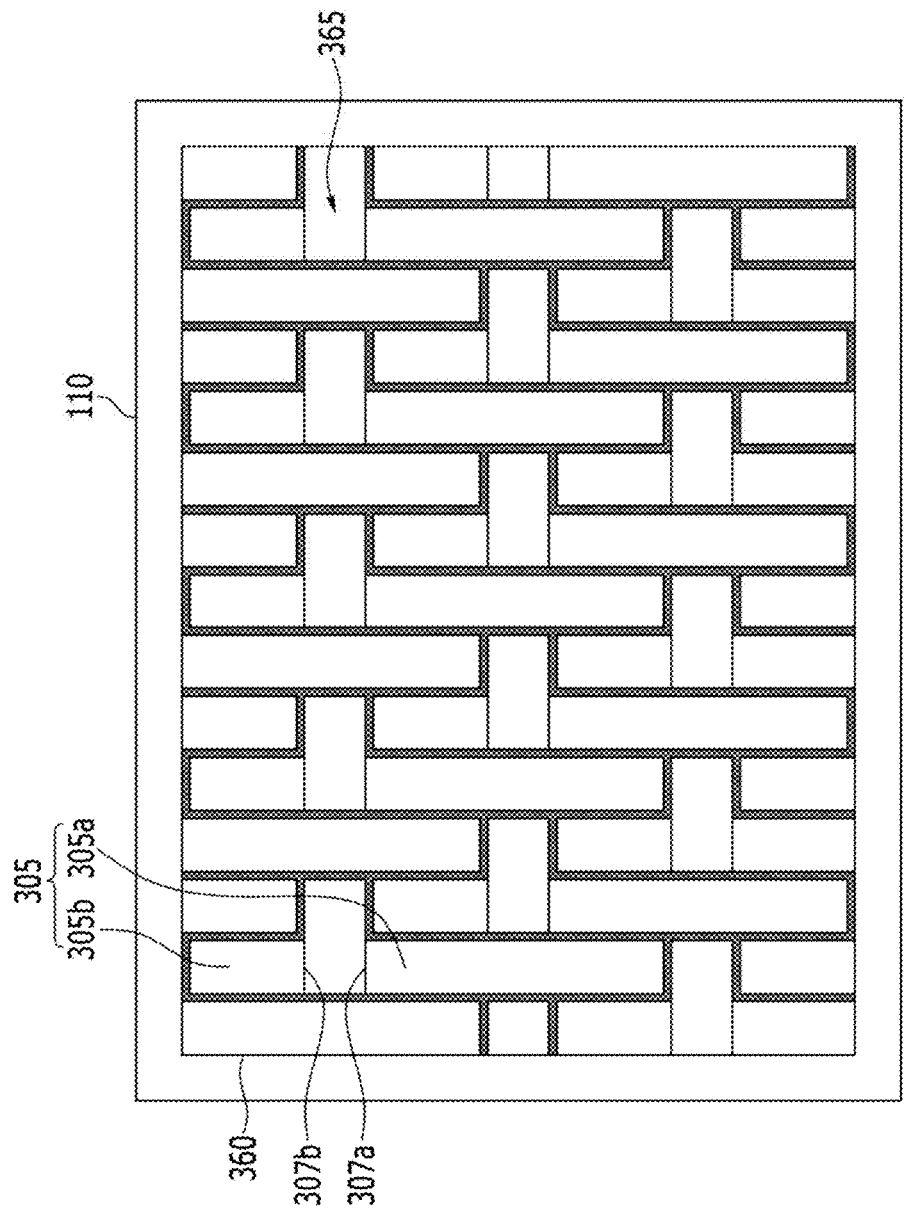
FIG. 18 is a top plan view illustrating the display device in accordance with another exemplary embodiment of the present inventive concept.

Since the display device in accordance with the exemplary embodiment of FIG. 18 is almost the same as the display device in accordance with the exemplary embodiment of FIG. 12, any redundant description will be omitted. The present exemplary embodiment is different from the above exemplary embodiment where the microcavities are formed to have the same size. In this embodiment, the microcavities may be formed to have different sizes. This will be described later in more detail.

FIG. 18 is a top plan view illustrating the display device in accordance with the exemplary embodiment of the present inventive concept.

A plurality of microcavities 305 covered by roof layers 360 are formed on the substrate 110. The microcavities 305 may have a substantially quadrangular planar shape.

Each of the microcavities 305 includes a first microcavity 305*a* and a second microcavity 305*b*. The first microcavity 305*a* and the second microcavity 305*b* are formed in different sizes. The first microcavity 305*a* is formed almost twice as large as the second microcavity 305*b* in this particular embodiment.

The openings 365 may be formed in the roof layer 360. The openings 365 have a substantially quadrangular shape, and are disposed in a row direction and an oblique direction.

The first microcavity 305*a* and the second microcavity 305*b* are disposed to be vertically adjacent to each other. Accordingly, the first injection hole 307*a* formed in the first microcavity 305*a* and the second injection hole 307*b* formed in the second microcavity 305*b* are formed to face each other with the opening 365 of the roof layer 360 therebetween.

Liquid materials having different properties may be respectively supplied to openings 365 located at a first row, openings 365 located at a second row, and openings located at a third row. Accordingly, the liquid materials having different properties may be respectively injected into the microcavities 305 located at the first row, the microcavities 305 located at the second row, and the microcavities 305 located at the third row. As a result, material layers having different properties are formed in the three microcavities that are adjacent to each other in the row direction.

For example, the liquid materials having different properties may be respectively injected into the microcavities 305 in which red pixels are formed, the microcavities 305 in which green pixels are formed, and the microcavities 305 in which blue pixels are formed. The material layers may include a red organic light emitting material layer, a green organic light emitting material layer, and a blue organic light emitting material layer. The red organic light emitting material layer, the green organic light emitting material layer, and the blue organic light emitting material layer may be formed to fill different microcavities 305.

Hereinafter, a display device in accordance with an exemplary embodiment will be described with reference to FIG. 19.

Since the display device in accordance with the exemplary embodiment of the present inventive concept illustrated in FIG. 17 is almost the same as the display device in accordance with the exemplary embodiment of FIG. 12, any redundant description will be omitted. The present exemplary embodiment is different from the above embodiment where the injection hole is formed in all the microcavities, in that no injection hole is formed in some of the microcavities. This will be described later in more detail.

Figure 19:
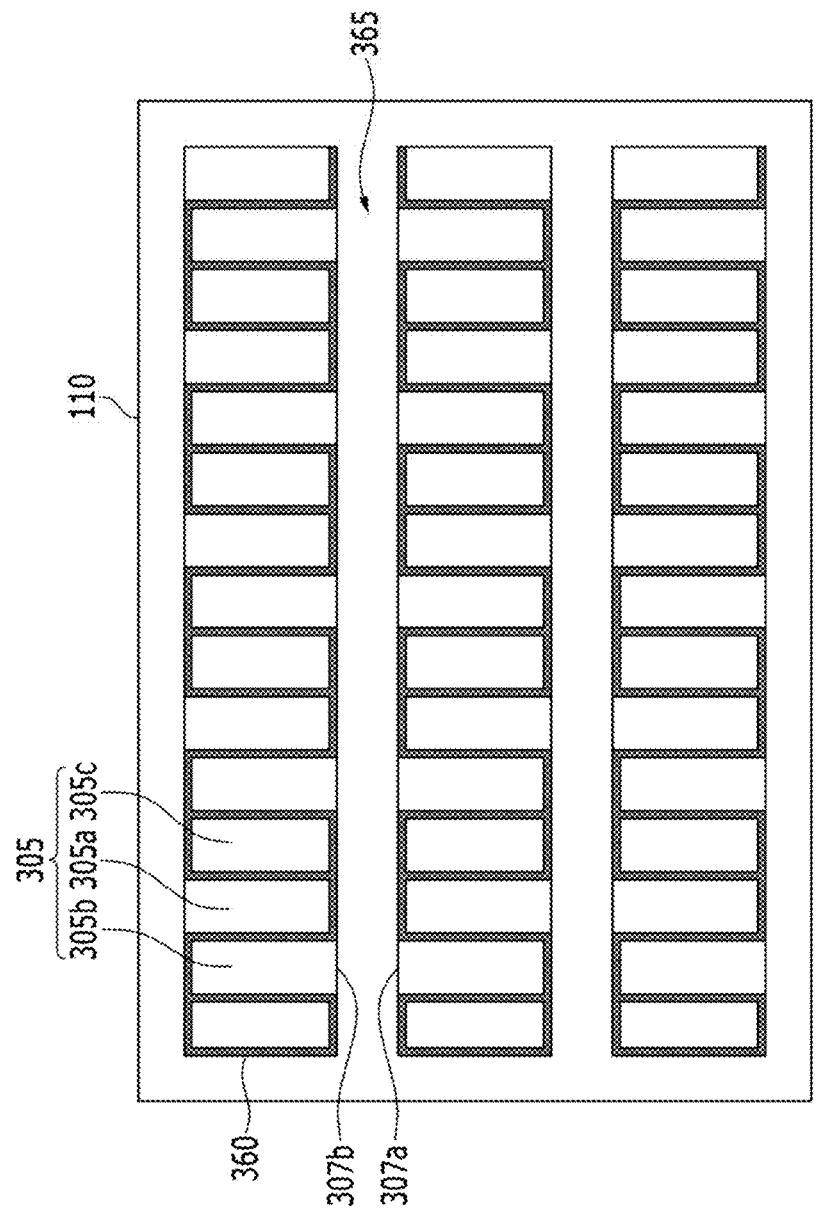
FIG. 19 is a top plan view illustrating the display device in accordance with yet another exemplary embodiment of the present inventive concept.

FIG. 19 is a top plan view illustrating the display device in accordance with the exemplary embodiment of the present inventive concept.

A plurality of microcavities 305 covered by roof layers 360 are formed on the substrate 110. The microcavities 305 may have a substantially quadrangular planar shape, and the microcavities 305 may be disposed in a matrix form.

Each of the microcavities 305 includes a first microcavity 305a, a second microcavity 305b, and a third microcavity 305c. The first microcavity 305a, the second microcavity 305b, and the third microcavity 305c are alternately arranged in a row direction. In FIG. 17, in the case of the microcavities 305 disposed in the first row, the third microcavity 305c, the second microcavities 305b, and the first microcavities 305a are disposed to repeat in that order. In the case of the microcavities disposed in a second row, the third microcavity 305c, the first microcavities 305a, and the second microcavities 305b are disposed to repeat in that order. In the case of the microcavities disposed in a third row, the third microcavity 305c, the second microcavities 305b, and the first microcavities 305a are disposed to repeat in that order.

The first injection hole 307a may be formed to expose a side surface of the first microcavity 305a, and the second injection hole 307b may be formed to expose a second side surface of the second microcavity 305b. No injection hole is formed in the third microcavity 305c. A second side surface of the first microcavity 305a is covered by the roof layer 360, and a first side surface of the second microcavity 305b is covered by the roof layer 360. All side surfaces of the third microcavity 305c are covered by the roof layer 360.

In this case, the first microcavity 305a and the second microcavity 305b are disposed to be vertically adjacent to each other. Accordingly, the first injection hole 307a and the second injection hole 307b are formed to face each other with the opening 365 of the roof layer 360 therebetween.

Two openings 365 are shown in FIG. 19, and liquid materials having different properties may be supplied to the two openings 365. Accordingly, material layers having different properties are respectively formed in the microcavities located in the second row and the microcavities located in the third row. Since no injection hole is formed in the third microcavity 305, no liquid material is injected therein.

For example, liquid materials having different properties may be respectively injected into the microcavities 305 in which red pixels are formed and the microcavities 305 in which green pixels are formed. The material layers may include a red quantum dot material layer and a green quantum dot material layer. The red quantum dot material layer and the green quantum dot material layer may be formed to fill different microcavities 305. In addition, the third microcavity 305 into which no liquid material is injected can be used to emit blue color light by using a backlight formed of blue light emitting diodes.

While this invention has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the disclosure and the appended claims.

What is claimed is:

1. A display device comprising:
   a substrate;
   a thin film transistor disposed on the substrate;
   a pixel electrode connected to the thin film transistor;
   microcavities disposed on the pixel electrode;
   a liquid crystal layer disposed in the microcavities;
   a roof layer disposed on the microcavities and covering some sides of the microcavities; and
   an encapsulation layer disposed on the roof layer to seal the microcavities, wherein openings are disposed in a matrix configuration, and the openings are respectively enclosed by four microcavities to have a rhombic shape in a plan view.

2. The display device of claim 1, wherein sides of the microcavities that are not covered by the roof layer form injection holes, the injection holes comprising:
   a first injection hole disposed on a first side surface of one of the microcavities; and
   a second injection hole disposed on a second side surface of the one of the microcavities, wherein the first injection hole and the second injection hole are disposed to face each other.

3. The display device of claim 2, wherein the microcavities have an octagonal shape in plan view.

4. The display device of claim 3, wherein the roof layer covers sides of the microcavities other than the first side surface and the second side surface.

5. The display device of claim 3, wherein the substrate is divided into a first region and a second region, and wherein at least one microcavity of the microcavities has a first side surface and a second side surface which face each other and a third side surface and a fourth side surface which face each other, the first, second, third, and fourth side surfaces not being adjacent to each other, the first injection hole and the second injection hole are respectively formed through the first side surface and the second side surface of the microcavity at the first region, and the first injection hole and the second injection hole respectively expose the third side surface and the fourth side surface of the microcavity at the second region.

6. The display device of claim 1, wherein a height of the roof layer located above the microcavities is higher than that of the roof layer located between the microcavities.

7. The display device of claim 1, wherein the openings have a polygonal shape.

8. The display device of claim 2, wherein the injection holes include:
a first injection hole extending through a part of the first side surface of the microcavity; and
a second injection hole extending through an entire part of the second side surface of the microcavity.

9. The display device of claim 8, wherein an area of the first injection hole is different from that of the second injection hole.

10. A display device comprising:
a substrate;
a thin film transistor disposed on the substrate;
a pixel electrode connected to the thin film transistor;
microcavities disposed on the pixel electrode;
a material layer disposed in the microcavities;
a roof layer disposed on the microcavities and covering some sides of the microcavities; and
an encapsulation layer formed on the roof layer to seal the microcavities,
wherein the material layer includes a first material layer made of a first material and a second material layer made of a second material,
the first material layer and the second material layer are disposed in different microcavities, and
the first material and the second material have different properties.

11. The display device of claim 10, wherein each of the microcavities has a first side surface and a second side surface that face each other, wherein the microcavities include a first microcavity and a second microcavity, and the injection holes include a first injection hole extending to the first side surface of the first microcavity, and a second injection hole extending to a second side surface of the second side surface.

12. The display device of claim 11, wherein a second side surface of the first microcavity and a first side surface of the second microcavity are covered by the roof layer.

13. The display device of claim 12, wherein the first microcavity and the second microcavity are adjacently disposed in a column direction and a row direction, and the first injection hole and the second injection hole are formed to face each other with the opening therebetween.

14. The display device of claim 12, wherein the microcavities which are disposed in a row direction are provided by repeatedly disposing one first microcavity and two microcavities according to a pattern.

15. The display device of claim 12, wherein the microcavities further include a third microcavity having all sides covered by the roof layer.

16. The display device of claim 10, wherein the material layer includes a first liquid crystal layer made of a first liquid crystal material and a second liquid crystal layer made of a second liquid crystal material, the first liquid crystal layer and the second liquid crystal layer fill different microcavities, and the first liquid crystal material and the second liquid crystal material have different properties.

17. The display device of claim 16, wherein the first liquid crystal material is different from the second liquid crystal material in response speed or transmittance.

18. The display device of claim 10, wherein the material layer includes a red organic light emitting material layer, a green organic light emitting material layer, and a blue organic light emitting material layer, and the red, green, and blue organic light emitting material layers fill different microcavities.

19. The display device of claim 10, wherein the material layer may include a red quantum dot material layer and a green quantum dot material layer, and the red quantum dot material layer and the green quantum dot material layer may fill different microcavities.

* * * * *